US012810394B2

(12) United States Patent
Thayyullathil et al.

(10) Patent No.: US 12,810,394 B2
(45) Date of Patent: Nov. 24, 2026

(54) MASKING UNWANTED PIXELS IN AN IMAGE

(71) Applicant: KONINKLIJKE PHILIPS N.V., Eindhoven (NL)

(72) Inventors: Hemanth Thayyullathil, Bangalore (IN); Jayant Sasikumar, Bangalore (IN); Anand Belagurki, Bangalore (IN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 217 days.

(21) Appl. No.: 18/551,658

(22) PCT Filed: Mar. 22, 2022

(86) PCT No.: PCT/EP2022/057432
§ 371 (c)(1),
(2) Date: Sep. 21, 2023

(87) PCT Pub. No.: WO2022/200314
PCT Pub. Date: Sep. 29, 2022

(65) Prior Publication Data
US 2024/0169491 A1 May 23, 2024

(30) Foreign Application Priority Data
Mar. 24, 2021 (EP) .................................... 21164479

(51) Int. Cl.
*G06T 5/70* (2024.01)
*G06T 7/11* (2017.01)
*G06T 11/00* (2006.01)

(52) U.S. Cl.
CPC .................. *G06T 5/70* (2024.01); *G06T 7/11* (2017.01); *G06T 11/00* (2013.01); *G06T 2207/30016* (2013.01)

(58) Field of Classification Search
CPC ... G06T 5/70; G06T 7/11; G06T 11/00; G06T 2207/30016; G06T 5/77; G06T 7/136
See application file for complete search history.

(56) References Cited

U.S. PATENT DOCUMENTS 7,593,561 B2 9/2009 Zhang et al.
11,017,507 B2 5/2021 Nagare et al.
(Continued)

FOREIGN PATENT DOCUMENTS

| | | | | | |
|---|---|---|---|---|---|
| CN | 105426903 | A | | 3/2016 | |
| CN | 108805920 | A | * | 11/2018 | ............... G06T 7/41 |
| JP | 2005246032 | A | | 9/2005 | |
| JP | 2008217494 | A | | 9/2008 | |
| JP | WO2008102898 | A1 | * | 5/2010 | ........... H04N 23/951 |
| JP | 2015062637 | A | | 4/2015 | |

(Continued)

OTHER PUBLICATIONS

KHUZI et.al., "Identification of Masses in Digital Mammogram Using Gray Level Co-Occurrence Matrices", Biomedical Imaging and Intervention Journal, Original Article, 2009,; 5(3): e17, pp. 1-13.

(Continued)

*Primary Examiner* — Mekonen T Bekele

(57) ABSTRACT

According to an aspect, there is provided an apparatus (300) for masking textured regions in an image. The apparatus (300) comprises a processor (302) configured to receive an input image having a plurality of pixels; determine, for each pixel of the plurality of pixels, a first image texture feature value; generate, based on the first image texture feature values, a mask; and apply the mask to the received input image to generate a masked image. A computer-implemented method and a computer program product are also provided.

18 Claims, 6 Drawing Sheets

(56) References Cited

U.S. PATENT DOCUMENTS

| | | | | |
|---|---|---|---|---|
| 2004/0208390 | A1 | 10/2004 | Jiang et al. | |
| 2008/0273787 | A1 | 11/2008 | Ducksbury et al. | |
| 2013/0230230 | A1 | 9/2013 | Ajemba et al. | |
| 2016/0275678 | A1 | 9/2016 | Onal et al. | |
| 2021/0401392 | A1* | 12/2021 | Bengtsson | G16H 30/40 |

OTHER PUBLICATIONS

Despotovic et al., "MRI Segmentation of the Human Brain: Challenges, Methods, and Applications", Hindawi Publishing Corporation, vol. 2015,23 pages, Oct. 1, 2014.

Haralick et al., "Textural Features for Image Classification", IEEE Transactions on Systems, Man, and Cybernetics , vol. SMC-3, No. 6, Nov. 1973, pp. 610-621.

Van Der Geest et al., "Advanced Analysis Techniques for Intracardiac Flow Evaluation from 4D Flow MRI", Curr. Radio Rep (2016), 4:38, New Imaging Technologies, May 2016, 10 pages.

Clifton et al., "Using Machine Learning Applied to Radiomic Image Features for Segmenting Tumour Structures", Proceedings of APSIPA Annual Summit and Conference 2019, Nov. 18-21, 2019, Lanzhou, China, pp. 1981-1988.

International Search report and Written Opinion of PCT/EP2022/057432, dated Jul. 29, 2022.

Uppuluri et al., "GLCM Texture Features", Nov. 25, 2008, www.mathworks.com/matlabentral/fileexchange/22187-glcm-texture-features.

* cited by examiner

MASKING UNWANTED PIXELS IN AN IMAGE

CROSS-REFERENCE TO PRIOR APPLICATIONS

This application is the U.S. National Phase application under 35 U.S.C. § 371 of International Application No. PCT/EP2022/057432, filed on Mar. 22, 2022 which claims the benefit of European Patent Application No. 21164479.4 filed on Mar. 24, 2021. These applications are hereby incorporated by reference herein.

FIELD OF THE INVENTION

The invention relates to masking unwanted pixels in an image and, more particularly, to masking textured regions in an image.

BACKGROUND OF THE INVENTION

A medical image acquired in respect of a subject (e.g. a patient) may be studied or reviewed by a medical professional, such as a radiologist, to assess the nature of a medical condition relevant to the subject. Depending on the imaging modality used to acquire the medical image, the medical image may include regions of interest along with regions which are less relevant or not relevant at all. For example, air surrounding an organ of interest (e.g. tissue of a human head) does not form a signal in a medical image and is of no interest in medical imaging. An observer (e.g. a radiologist) focusses their attention on a region of interest which, in the example of a human head, may include the brain and the tissues surrounding the brain, such as the skull and fat, for visual analysis. Any pixels in the image having no signal or low signal are not useful for further analysis, and are referred to herein as 'unwanted pixels'.

A magnitude image is one class of image that may be acquired using some imaging modalities. In magnitude images, unwanted pixels may manifest as low signal regions and, therefore, they are easy to exclude during visual analysis or during image processing, by using techniques such as intensity-based thresholding. A different class of images, known as phase images, may be used to capture features such as velocity, magnetic susceptibility and temperature, for example using magnetic resonance imaging (MRI). In phase images, the unwanted pixels may exhibit extreme values of phase and may appear as pixels having no correlation with their neighboring pixels. Therefore, intensity-based thresholding is less effective when dealing with phase images.

Removal of unwanted pixels from images can help with visualization (e.g. by a radiologist) and image processing. In terms of visualization, removal of unwanted pixels ensures that the observer is provided with a 'cleaner' image. For image processing, removal of unwanted pixels helps to improve accuracy of image analysis particularly for tissues near the unwanted pixels consider an example of phase image acquired using MRI: specifically, a flow velocity image. When computing effective velocity vectors (e.g. from three velocity images acquired along x, y and z axes) at user-drawn regions in such an image, the unwanted pixels have meaningless values. Usage of these unwanted pixels in computation can result in spurious jumps in magnitudes and directions of velocity vectors for the region. Removal of unwanted pixels also helps with lesser computational burden, for example, an analysis that involves pixel wise computation.

It would therefore be useful to have a technique for reliably removing unwanted pixels from an image in order to mitigate at least one of the problems identified above.

SUMMARY OF THE INVENTION

By processing an image, such as a medical image, in a particular way, it is possible to remove, or at least mask or hide, regions in the image that are not relevant for analysis, such as those regions including pixels referred to as 'unwanted pixels' herein. The inventors of the present disclosure have recognized that masking or removal of the unwanted pixels can be achieved by making use of the fact that regions in the phase image that are formed by these unwanted pixels are highly textured. Analysis of textural properties of the image helps in delineating these regions accurately. Specifically, by performing texture analysis of the image, those regions of the image that appear to have a large amount of texture (e.g. speckled) can be distinguished from those regions of the image that appear to be "smooth", with less texture. In some types of image, these textured regions may be recognized as noise or background data that is not relevant to the analysis of the image. Once the textured regions of the image have been identified, a mask can be generated that covers those identified textured regions, and the mask can be applied to the image, thereby effectively removing the unwanted pixels.

According to a first specific aspect, there is provided an apparatus for masking unwanted pixels in an image, the apparatus comprising a processor configured to: receive an input image having a plurality of pixels: determine, for each pixel of the plurality of pixels, a first image texture feature value: generate, based on the first image texture feature values, a mask: and apply the mask to the received input image to generate a masked image.

The degree of texture (e.g. the local texture) apparent in an image is a reliable indicator of a region that does not correspond to a surface, such as tissue, as tissue appears smooth (i.e. less textured). Thus, by identifying those regions of the image that are textured, it is possible to create a mask for those regions, and segment regions of unwanted pixels within the image.

The processor may be configured to determine each of the first image texture feature values by: computing grey level co-occurrence matrix (GLCM) statistics: and determining the first image texture feature value based on one of the GLCM statistics.

In some embodiments, the computed first image texture feature values may comprise one of contrast, correlation, energy, homogeneity, gradient and entropy.

The processor may, in some embodiments, be further configured to determine, for each pixel of the plurality of pixels, a plurality of second image texture feature values: and combine the first image texture feature values and the second image texture feature values. The generation of the mask may be based on the first image texture feature values and the plurality of second image texture feature values.

In some embodiments, the first image texture feature values may be determined based on a first grey level co-occurrence matrix statistic, and at least one of the plurality of second image texture feature values is determined based on a second grey level co-occurrence matrix statistic.

The processor may be further configured to apply a first weight to the first image texture feature value: and apply a second weight to the second image texture feature value. The generation of the mask may be based on the weighted first and second image texture feature values.

In some embodiments, the input image may comprise a phase image.

Generating the mask may, in some embodiments, comprise, responsive to determining that the first image texture feature value for a given pixel of the plurality of pixels meets or exceeds a defined threshold value, generating the mask in respect of the given pixel.

According to a second specific aspect, there is provided a computer-implemented method for masking unwanted pixels in an image, the method comprising receiving an input image having a plurality of pixels: determining, for each pixel of the plurality of pixels, a first image texture feature value: generating, based on the first image texture feature values, a mask: and applying the mask to the received input image to generate a masked image.

Determining a first image texture feature value may, in some embodiments, comprise computing grey level co-occurrence matrix (GLCM) statistics; and determining the first image texture feature value based on one of the GLCM statistics.

In some embodiments, the method may further comprise determining, for each pixel of the plurality of pixels, a plurality of second image texture feature values: and combining the first image texture feature values and the second image texture feature values. The generation of the mask may be based on the first image texture feature values and the plurality of second image texture feature values.

At least one of the first image texture feature values and the second image texture feature values may comprise one of contrast, correlation, energy, homogeneity, gradient and entropy.

In some embodiments, the first image texture feature values may be determined based on a first grey level co-occurrence matrix statistic, and at least one of the plurality of second image texture feature values is determined based on a second grey level co-occurrence matrix statistic. The generation of the mask may be based on a weighted combination of the first and second image texture feature values.

The method may, in some embodiments, further comprise providing the masked image for storage in a storage medium or for display on a display unit.

According to a third specific aspect, there is provided a computer program product comprising a non-transitory computer-readable medium, the computer-readable medium having computer-readable code embodied therein, the computer-readable code being configured such that, on execution by a suitable computer or processor, the computer or processor is caused to perform steps of the methods disclosed herein.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Embodiments of the present disclosure provide a mechanism by which unwanted pixels can be masked in or removed from an image, leaving just those pixels falling within a region of interest (ROI). As used herein, the ROI of an image is intended to refer to a portion of an image that is to be observed and assessed by an observer. For example, the ROI may comprise a tissue region (e.g. the brain or skull) of a medical image. Unwanted pixels in an image are identified by analyzing the image and finding pixels that fall within a highly textured region. Textured regions of some medical images (e.g. phase images) may correspond to regions where no tissue is present (e.g. in background regions of the image), or where gas (e.g. air) is present within a cavity in an organ being imaged, but where the organ itself (i.e. the ROI) is not visible. These textured regions are of little or no use to an observer of the image and, therefore, pixels falling within such regions are termed 'unwanted pixels'. In medical images, for example, the unwanted pixels may be considered to be pixels within regions that do not correspond to tissue but which appear (e.g. as noise) in the image. Identification of the textured regions and, therefore of the unwanted pixels, is achieved by assessing a texture feature value for pixels in an image and, based on the texture feature values, a mask is generated that includes the unwanted pixels that are location within the textured region. By applying the mask to the original image, the unwanted pixels can be masked or removed from the image, leaving just the region or regions of interest.

Figure 1:
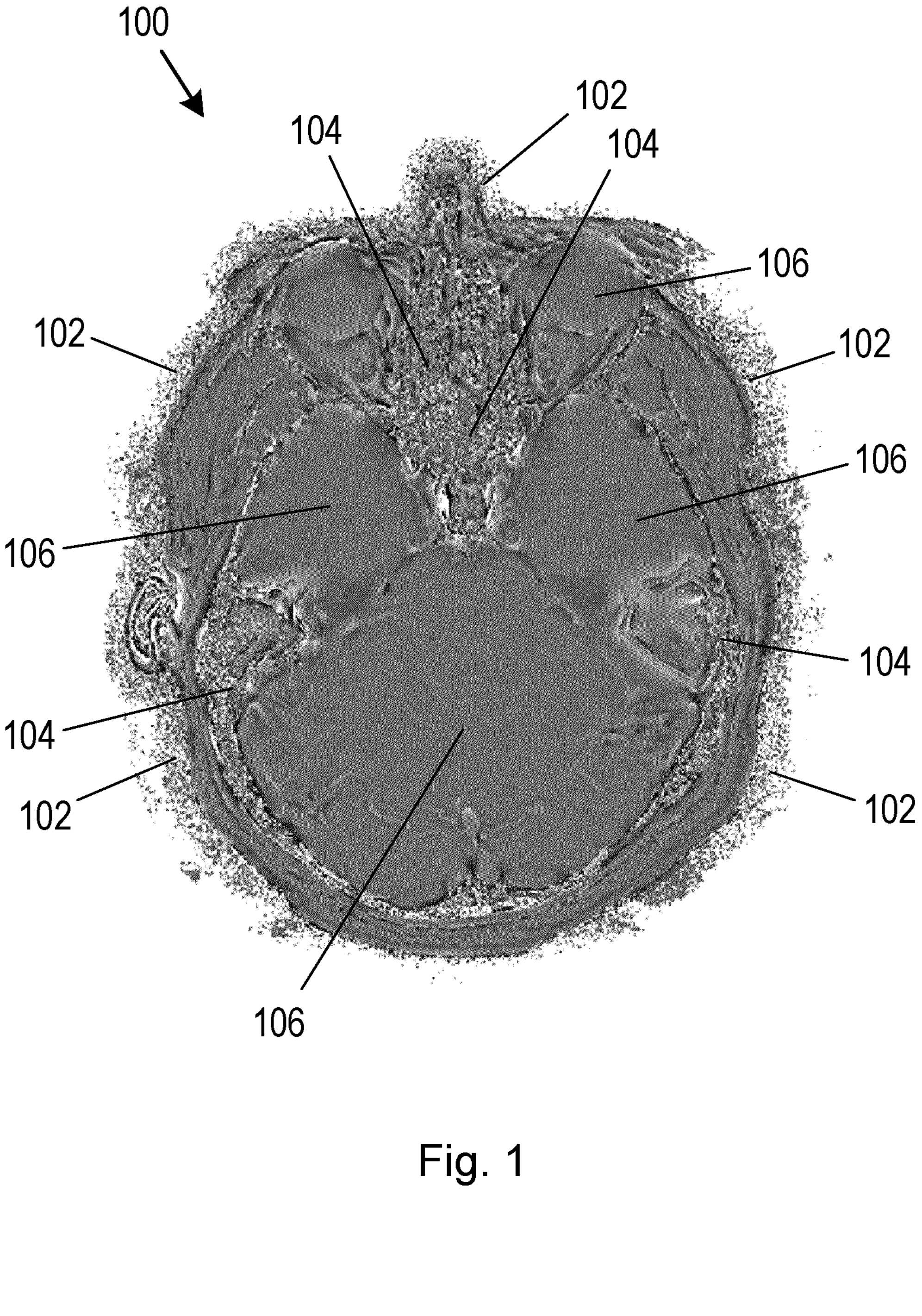
FIG. 1 is an illustration of a phase image of the head of a subject.

Referring to the drawings. FIG. 1 is an illustration of an image 100 of a head of a subject. In this example, the image 100 is a phase image, which is a particular type of image that may be acquired using some imaging modalities, including magnetic resonance imaging. In this example, the phase image is one acquired from a scan of the head. It will, however, be appreciated that, in other examples, other organs may be imaged. Various regions of the phase image are labelled. Regions labelled 102 represent areas outside the organ being imaged—in this case the head. The pixels in the regions 102 have non-zero values (e.g. greyscale values) as a result, for example, of computing phase values from random complex (comprising real and imaginary parts) measurements of noisy pixels. These non-zero values are meaningless. Regions labelled 104 represent areas within an outer boundary of the signal forming organs in which pixels have meaningless, non-zero values as mentioned above. The regions 102 and 104 are considered to be "textured" as a result of their stippled or speckled appearance and, in some examples, may be considered to have a low signal to noise ratio (SNR). In comparison, regions labelled 106 have a smooth appearance in the image, and these regions represent tissue within the subject's head, that typically have high SNR.

The contrasting textured and smooth regions are particularly evident in phase images due to the way such images are created. Phase images include a magnitude image counterpart, as they are derived from complex images of the form $I=I_0e^{-\Phi}$. Here, I is the complex image that is acquired and $I_0$ and $\phi$ are the magnitude and phase images that are derived from the complex image. In phase images, physical parameters (or qualitative phase contrast) may be obtained in terms of phase values in the range $(-\pi, \pi)$ and pixel values in preferred units after scaling (e.g., cm/s). Grey levels, or greyscale values, of background pixels or pixels of very low SNR (high noise) (e.g. unwanted pixels) are meaningless in phase images and have a random value, typically close to $-\pi$ or $\pi$. As neighboring pixels in the background/low SNR regions (e.g. the regions 102, 104) do not have any correlation between them, those regions in phase images appear highly textured.

Using the image processing techniques described herein, pixels within the regions 102, 104 can be identified, and through the application of a mask, those pixels (i.e. the unwanted pixels) can be masked or removed from the image.

Figure 2:
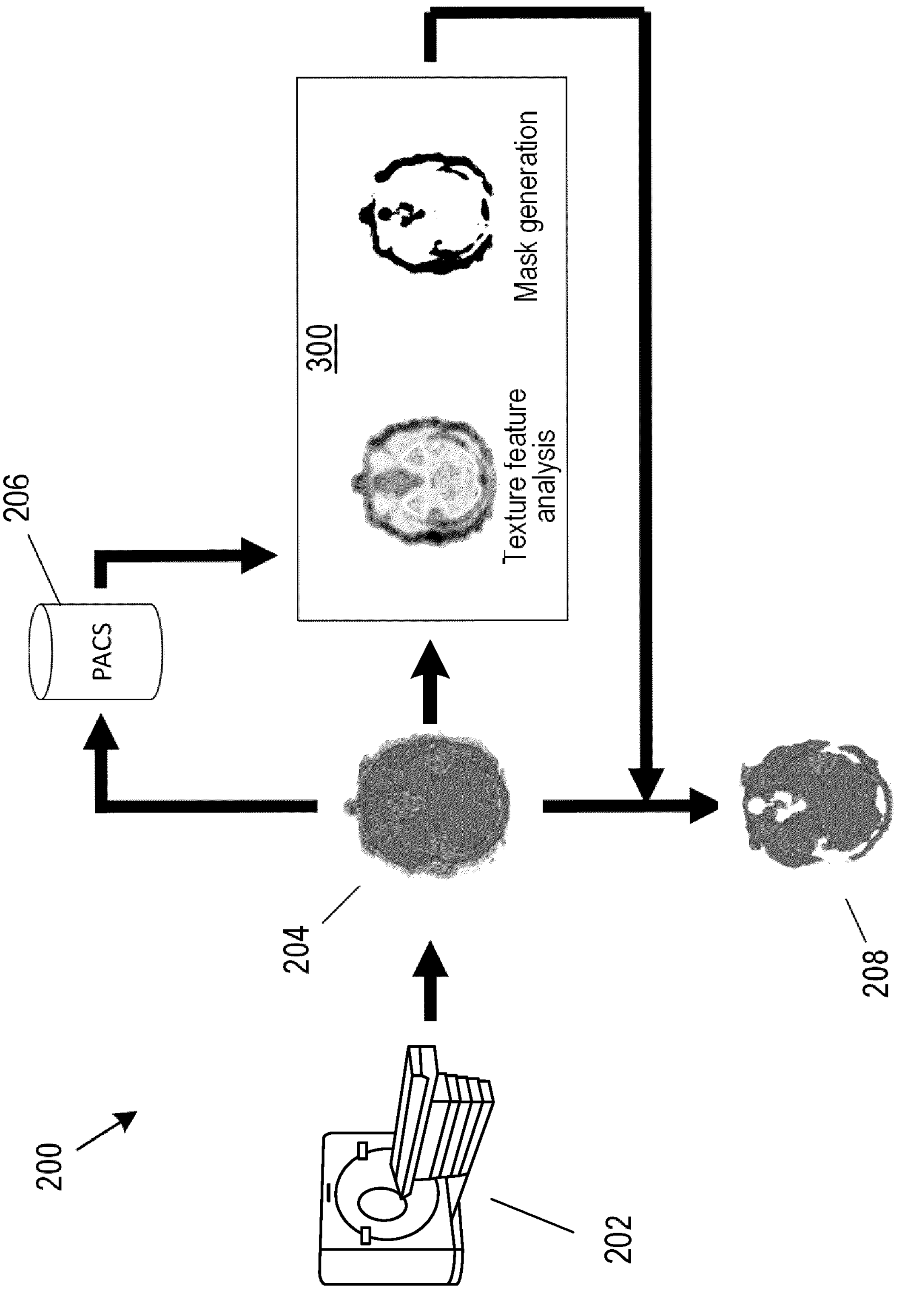
FIG. 2 is a schematic illustration of an example of a system for removing unwanted pixels from an image.

FIG. 2 is a simplified schematic illustration of an example of a system 200 for removing unwanted pixels from an image, such as the image 100. The system 200 includes an imaging device 202 for acquiring an image. The imaging device 202 may, for example, comprise a medical imaging scanning device capable of acquiring one or more images in respect of a person or animal (referred to herein as a subject). The imaging device 202 may capture images using any known imaging modality, including medical imaging modalities such as computed tomography (CT), 35 computed axial tomography (CAT), positron emission tomography (PET), single photon emission computed tomography (SPECT), magnetic resonance (MR), ultrasound (US), or a hybrid imaging modality involving a combination of imaging techniques.

The imaging device 202 may generate an image 204 which may comprise, or be similar to, the image 100 shown in FIG. 1 above. In some examples, the image 204 may comprise a phase image. However, it will be appreciated that embodiments of the present invention may also be applied to other types of image.

Within the system 200, the imaging device 202 is in communication (e.g. via a wired or wireless connection) with an apparatus 300 which is configured to perform image processing techniques such as those disclosed herein in order to remove unwanted pixels from the image 204. The apparatus 300 may comprise a computing device (e.g. a workstation, a desktop computer, a laptop computer, a tablet computer, a wearable device or a server) and/or may include one or more processors configured to perform the functionality disclosed herein. While a single apparatus 300 is shown in FIG. 2, in other examples, the system 200 may include multiple apparatuses. For example, multiple apparatuses each having a processor may be used to perform one or more processing steps.

The apparatus 300 may, in some embodiments, be configured to receive the image 204 from the imaging device 202. For example, the imaging device 202 may transmit the image 204 directly to the apparatus 300 for processing following its acquisition. In other examples, the image 204 may be provided from the imaging device 202 to a storage device (e.g. a memory) for storage prior to being provided to the apparatus 300. For example, the acquired image 204 may be provided to (e.g. uploaded to) a Picture Archiving and Communication System (PACS) 206 for storage prior to being provided to the apparatus 300. In such examples, the apparatus 300 may obtain or retrieve the image 204 from the PACS 206 (or from any other storage device) for processing.

Figure 3:
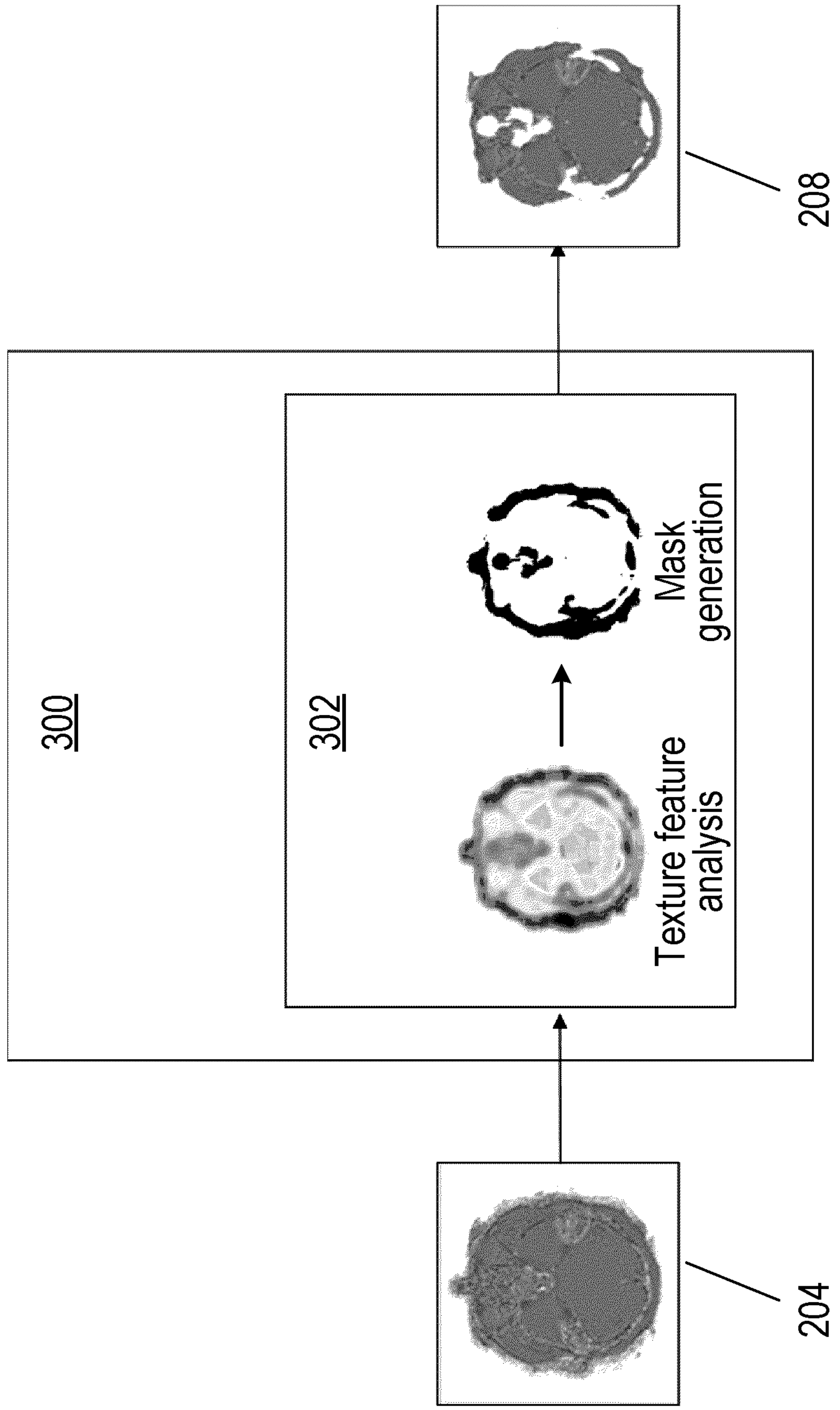
FIG. 3 is a schematic illustration of an example of an apparatus for removing unwanted pixels from an image.

The process of removing unwanted pixels from an image, such as the image 204, is discussed in detail below with reference to FIG. 3. Generally, however, the image 204 is analyzed in a pixel-wise manner, and an image texture feature value is determined for each pixel. Based on the image texture feature values, pixels that fall within a textured region of the image 204 (i.e. unwanted pixels) can be identified. A mask is generated that includes the textured regions of the image, and the generated mask can be applied to the image 204 to mask or remove those pixels within the masked regions. The output of the apparatus 300 is a masked image 208 which is a version of the original image 204 without the unwanted pixels.

According to a first aspect, an apparatus is provided. FIG. 3 is a schematic illustration of an example of the apparatus 300. The apparatus 300 is configured for masking unwanted pixels in an image, and comprises a processor 302. The processor 302 is configured to receive an input image 204 having a plurality of pixels. As discussed above with reference to FIG. 2, the input image 204 may be received directly from an imaging device 202 or from some other source, such as an image database or a PACS 206. The input image 204 may, in some embodiments, comprise a phase image. The processor 302 is configured to determine, for each pixel of the plurality of pixels, a first image texture feature value. The first image texture feature value for a particular pixel may be indicative of a degree of texture of the region in which the particular pixel is located. Specifically, the first image texture feature value for a pixel may indicate a texture based on the pixel and its surrounding pixels. The processor 302 is further configured to generate, based on the first image texture feature values, a mask, and apply the mask to the received input image 204 to generate a masked image 208. The generation of the mask and the application of the mask to the received input image 204 is discussed in greater detail below.

One way in which the present invention may determine the first image texture feature value for each of the plurality of pixels is by using grey level co-occurrence matrices. Thus, in some embodiments, the processor 302 may be configured to determine each of the first image texture feature values by computing grey level co-occurrence matrix (GLCM) statistics, and determining the first image texture feature value based on one of the GLCM statistics. The GLCM statistics may be computed by analyzing a given pixel and characterizing whether the grey level (e.g. the greyscale value ranging from 0 to 255) of its neighboring pixels are similar or different to the given pixel. As noted above, in some image types (e.g. phase images), pixels in a background region, or in a cavity within a tissue region, may have little or no correlation with their neighboring pixels, giving rise to the textured appearance in an image. Assessing the neighboring pixels of a given pixel may be achieved by analyzing the pixels in a 3×3 matrix of pixels centered on the given pixel. In other examples, a larger set of pixels may be analyzed with respect to the given pixel. For example, a 3×7 matrix of pixels or a 7×3 matrix of pixels may be analyzed. Other matrix sizes may alternatively be used and, in some embodiments, combinations of different matrix sizes may be used. Assessing larger matrices may be useful for measuring texture of large speckle sizes. The first image texture feature value (e.g. a value representing the grey level co-occurrence matrix statistic) a given pixel is associated with that pixel, and values are determined in a pixel-wise manner for all of the pixels of the plurality of pixels. In some examples, the plurality of pixels may comprise all of the pixels in the input image 204. A ‘statistical map’ corresponding to the input image 204 is obtained once the first image texture feature values for the plurality of pixels have been determined.

Various grey level co-occurrence matrix statistics may be computed and used as image texture feature values in the subsequent analysis. In some embodiments, the computed first image texture feature values may comprise one of contrast, correlation, energy, homogeneity, gradient and entropy. For example, the GLCM gradient statistic may provide an indication of the difference in grey level between the given pixel and its neighboring pixels: the GLCM contrast statistic may provide an indication of the local variations in the matrix: the GLCM correlation statistic may provide an indication of the joint probability occurrence of specified pixel pairs: the GLCM energy statistic may provide an indication of the sum of squared elements in the matrix (this may also be referred to as uniformity or the angular second moment): and the GLCM homogeneity statistic may provide an indication of the closeness of the distribution of elements in the matrix to the matrix diagonal. Generally, each of the GLCM statistics characterizes local texture in some sense.

While useful information regarding the texture of a region may be deduced by computing just one GLCM statistic for each of the plurality of pixels, even more useful information may be deduced by computing multiple GLCM statistics for each of the plurality of pixels. Thus, the processor 302 may, in some embodiments, be further configured to determine, for each pixel of the plurality of pixels, a plurality of second image texture feature values. Each of the second image texture feature values may be determined by computing a further GLCM statistic. Thus, the first image texture feature values may be determined based on a first grey level co-occurrence matrix statistic, and at least one of the plurality of second image texture feature values may be determined based on a second grey level co-occurrence matrix statistic.

The processor 302 may be further configured to combine the first image texture feature values and the second image texture feature values. In other words, for each pixel of the plurality of pixels, the first image texture feature value is combined with the second image texture feature values. If, for example, the GLCM statistics determined in respect of each pixel of the plurality of pixels are contrast, correlation, energy and homogeneity, then the four image texture feature values (i.e. the four different GLCM statistics) for each pixel are combined. The combination of image texture values results in a feature vector for each pixel or for a group of pixels. In some examples, clustering techniques (e.g. k-means clustering) may be performed on the pixels based on the combined texture property, represented by the feature vector. This results in pixels being grouped into a defined number of clusters in the order of the presence of local texture.

In embodiments where a second image texture feature value, or a plurality of second image texture feature values are determined for each pixel of the plurality of pixels, the generation of the mask may be based on the first image texture feature values and the plurality of second image texture feature values.

In some examples, the image texture feature values may be weighted according to weights set automatically (e.g. through a rule-based algorithm or a machine learning based algorithm) or manually by an operator. In such examples, the processor 302 may be further configured to apply a first weight to the first image texture feature value, and apply a second weight to the second image texture feature value. Thus, the combination of the first and second image texture feature values may comprise a weighted summation of the values for each pixel. The combined value for each pixel may, in some examples, be scaled (e.g. by normalization) between 0 and 1 or between 0 and 255, for example.

The mask may be generated based on the combined values (i.e. the combination of the first image texture feature values and the second image texture feature values) for the plurality of pixels. For example, a threshold value may be applied such that, if the combined value for a pixel is below the threshold value, the mask is not applied and the corresponding pixel of the input image 204 remains unchanged (i.e. the degree of texturing is low, so the pixel is not an 'unwanted pixel'). The threshold value may, in one example, comprise 0.7×the mean pixel value (e.g. grey level value) over the plurality of pixels. In other examples, a different threshold value may be used. Thus, generating the mask may comprise, responsive to determining that the first image texture feature value for a given pixel of the plurality of pixels meets or exceeds a defined threshold value, generating the mask in respect of the given pixel. In examples where weights are applied to the first and/or second image texture feature values, the generation of the mask may be based on the weighted first and second image texture feature values.

If the combined value for a pixel is above the threshold value, the mask is applied and the corresponding pixel of the input image 204 is masked or removed (e.g. the grey level of the pixel is changed to 0) (i.e. the degree of texturing is high, so the pixel is an 'unwanted pixel'). Thus, the generated mask may comprise a series of 0s and 1s, depending on whether or not the corresponding pixel of the input image 204 is to remain or to be deleted. The processor 302 may apply the mask to the received input image 204, for example by multiplying the grey level value of each of the plurality of pixels in the input image 204 with the value (e.g. 0 or 1) of the corresponding pixel in the mask. The resulting masked image 208 contains just those pixels of the input image 204 that are "wanted", namely those pixels that correspond to the region of interest (e.g. tissue).

Figure 4:
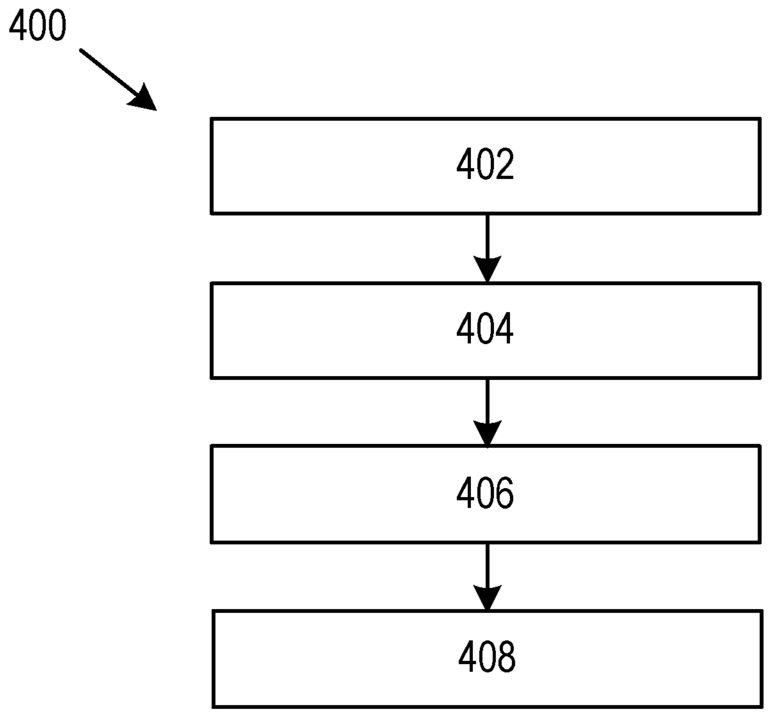
FIG. 4 is a flowchart of an example of a method of removing unwanted pixels from an image.

According to a further aspect, a method is provided. FIG. 4 is a flowchart of an example of a method 400. The method 400, which may be considered to be a method for masking unwanted pixels in an image, may comprise a computer-implemented method. The method 400 comprises, at step 402, receiving an input image 204 having a plurality of pixels. At step 404, the method 400 comprises determining, for each pixel of the plurality of pixels, a first image texture feature value. As discussed above, in some examples, determining the first image texture feature value may comprise computing grey level co-occurrence matrix (GLCM) statistics, and determining the first image texture feature value based on one of the GLCM statistics. The method 400 comprises, at step 406, generating, based on the first image texture feature values, a mask. Thresholding techniques may be used to generate the mask, as disclosed herein. At step 408, the method 400 comprises applying the mask to the received input image 204 to generate a masked image 208.

Figure 5:
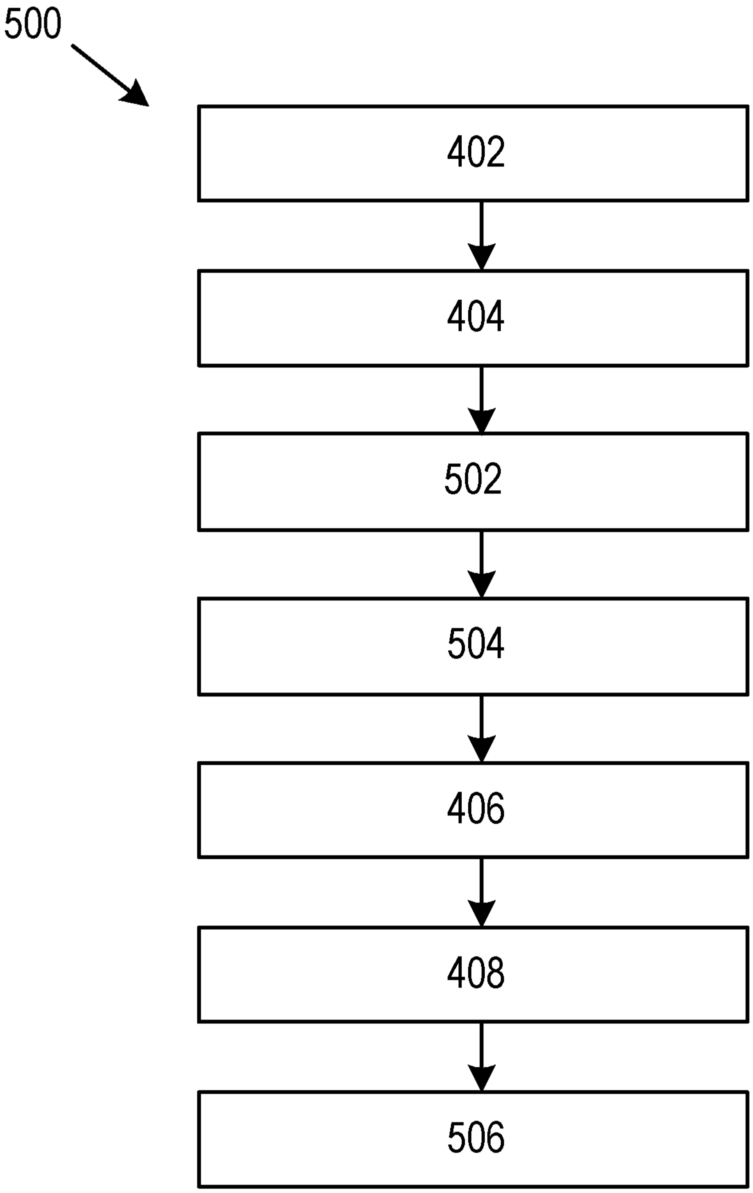
FIG. 5 is a flowchart of a further example of a method of removing unwanted pixels from an image.

FIG. 5 is a flowchart of a further example of a method 500. The method 500 may also comprise computer-implemented method, and may include one more steps of the method 400 discussed above. In some embodiments, the method 500 may further comprise, at step 502, determining, for each pixel of the plurality of pixels, a plurality of second image texture feature values. In other examples, the method 500 may comprise determining, for each pixel of the plurality of pixels, a second image texture feature value, such that just first and second image texture feature values are determined for each pixel. In some embodiments, two image texture feature values may be determined for each pixel (e.g. the first image texture feature value and a second image texture feature value) while, in other embodiments, more than two image texture feature values may be determined for each pixel. At step 504, the method 500 may further comprise combining the first image texture feature values and the second image texture feature values. Combining the image texture feature values may be achieved using a simple summation, a weighted summation, or any other technique for combining numerical values. In embodiments where multiple image texture feature values are determined for each pixel, the generation of the mask at step 406 may be based on the first image texture feature values and the plurality of second image texture feature values.

The image texture feature values may be determined based on various grey level co-occurrence matrix statistics. In some embodiments, at least one of the first image texture feature values and the second image texture feature values may comprise one of contrast, correlation, energy, homogeneity, gradient and entropy. The first image texture feature values may, in some embodiments, be determined based on a first grey level co-occurrence matrix statistic, and at least one of the plurality of second image texture feature values may be determined based on a second grey level co-occurrence matrix statistic. In such embodiments, the generation of the mask (step 406) may be based on a weighted combination of the first and second image texture feature values. Thus, weights may be applied to each of the image texture feature values (or applied to each of the GLCM statistics) when the values are combined at step 504.

The masked image 208 generated at step 408 may be provided for use to an observer, such as a radiologist instead of, or as well as, the original input image 204. The masked image 208 includes pixels corresponding to the region of interest (e.g. regions of tissue), that the observer intends to focus on, but does not include the unwanted pixels that appear as textured areas in the background and/or within regions in the organ where there are no tissues (e.g. air cavities). At step 506, the method 500 may further comprise providing masked image 208 for storage in a storage medium and/or for display on a display unit. In some examples, the masked image 208 may be provided and stored in the PACS 206. For example, an electronic health record (EHR) of a patient may be updated to include the masked image 208 along with (e.g. associated with) the original input image 204.

Steps of the methods 400, 500 disclosed herein may be performed using one or more processors of one or more computing devices. In some embodiments, all of the steps may be performed using one processor and/or one computing device while, in other examples, different steps of the methods may be performed using different processors and/or different computing devices. Examples of computing devices include desktop computers, laptop computers, tablet computers, smart phones, wearable devices and/or servers, and one or more of processors and/or computing devices may form part of a cloud-computing environment.

Figure 6:
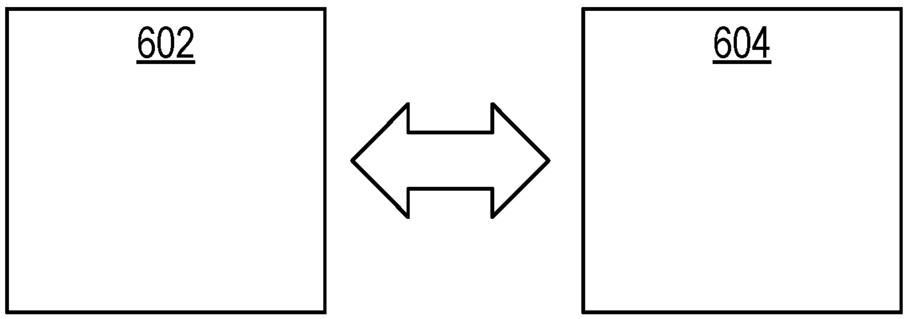
FIG. 6 is a schematic illustration of an example of a processor in communication with a computer readable medium.

According to a further aspect, a computer program product is provided. FIG. 6 is a schematic illustration of an example of a computer-readable medium 604 in communication with a processor 602. The processor 602 may comprise or be similar to the processor 302 discussed above. A computer program product comprises a non-transitory computer-readable medium 604, the computer-readable medium having computer-readable code embodied therein, the computer-readable code being configured such that, on execution by a suitable computer or processor 602, the computer or processor is configured to perform steps of the methods 400, 500 disclosed herein. For example, according to one embodiment, the computer-readable medium includes computer-readable code configured such that, on execution by the processor 602, the processor is configured to receive an input image having a plurality of pixels: determine, for each pixel of the plurality of pixels, a first image texture feature value: generate, based on the first image texture feature values, a mask: and apply the mask to the received input image to generate a masked image.

Embodiments of the present disclosure provide a mechanism by which an input image (e.g. a medical image, such as a phase image) can be processed to remove unwanted pixels. In various examples, unwanted pixels may include pixels within background regions of the input image and/or pixels that are of little or no interest to an observer of the image. By using texture analysis techniques, including for example the determination of grey level co-occurrence matrix statistics for pixels in the image, textured regions of the image can be identified, and a mask can be generated that includes just those textured regions. By applying the generated mask to the original input image, a masked image can be obtained which provides numerous advantages both for the observer and in terms of additional image processing. The masked image is cleaner, with fewer regions of meaningless data, meaning an observer can view and analyses the relevant parts of the image more effectively. Moreover, any further image analysis performed in respect of the masked image is likely to be more accurate, particularly in regions near to the boundary of wanted pixels unwanted pixels. The use of image texture feature values of the pixels to generate the mask is shown to be particularly effective for identifying textured regions of the image, that can appear, particularly in phase images. Embodiments disclosed herein are particularly beneficial for processing flow velocity images, such as images acquired to measure blood flow or cerebrospinal fluid (CSF) flow using, magnetic resonance (MR) imaging, for example, MR susceptibility phase images, or temperature maps in MR-guided high-intensity focused ultrasound (HIFU).

The processor 302, 602 can comprise one or more processors, processing units, multi-core processors or modules that are configured or programmed to control the apparatus 300 in the manner described herein. In particular implementations, the processor 302, 602 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

The following clauses are considered, advantageous and exemplifying. Embodiments are not limited to this clauses.

Clause 1. An apparatus (300) for masking unwanted pixels in an image, the apparatus comprising:

a processor (302) configured to:

receive an input image (204) having a plurality of pixels;

determine, for each pixel of the plurality of pixels, a first image texture feature value;

generate, based on the first image texture feature values, a mask; and apply the mask to the received input image to generate a masked image (208).

Clause 2. An apparatus (300) according to clause 1, wherein the processor (302) is configured to determine each of the first image texture feature values by:

computing grey level co-occurrence matrix (GLCM) statistics; and determining the first image texture feature value based on one of the GLCM statistics.

Clause 3. An apparatus (300) according to clause 1 or clause 2, wherein the computed first image texture feature values comprise one of contrast, correlation, energy, homogeneity, gradient and entropy.

Clause 4. An apparatus (300) according to any of the preceding clauses, wherein the processor (302) is further configured to:

determine, for each pixel of the plurality of pixels, a plurality of second image texture feature values; and combine the first image texture feature values and the second image texture feature values;

wherein the generation of the mask is based on the first image texture feature values and the plurality of second image texture feature values.

Clause 5. An apparatus (300) according to clause 4, wherein the first image texture feature values are determined based on a first grey level co-occurrence matrix statistic, and at least one of the plurality of second image texture feature values is determined based on a second grey level co-occurrence matrix statistic.

Clause 6. An apparatus (300) according to clause 4 or clause 5, wherein the processor (302) is further configured to:

apply a first weight to the first image texture feature value; and apply a second weight to the second image texture feature value;

wherein the generation of the mask is based on the weighted first and second image texture feature values.

Clause 7. An apparatus (300) according to any of the preceding clauses, wherein the input image (204) comprises a phase image.

Clause 8. An apparatus (300) according to any of the preceding clauses, wherein generating the mask comprises:

responsive to determining that the first image texture feature value for a given pixel of the plurality of pixels meets or exceeds a defined threshold value, generating the mask in respect of the given pixel.

Clause 9. A computer-implemented method (400) for masking unwanted pixels in an image, the method comprising:

receiving (402) an input image having a plurality of pixels;

determining (404), for each pixel of the plurality of pixels, a first image texture feature value;

generating (406), based on the first image texture feature values, a mask; and applying (408) the mask to the received input image to generate a masked image.

Clause 10. A computer-implemented method (400) according to clause 9, wherein determining a first image texture feature value comprises:

computing grey level co-occurrence matrix (GLCM) statistics; and determining the first image texture feature value based on one of the GLCM statistics.

Clause 11. A computer-implemented method (400, 500) according to clause 9 or clause 10, further comprising:

determining (502), for each pixel of the plurality of pixels, a plurality of second image texture feature values; and combining (504) the first image texture feature values and the second image texture feature values;

wherein the generation of the mask is based on the first image texture feature values and the plurality of second image texture feature values.

Clause 12. A computer-implemented method (400, 500) according to clause 11, wherein at least one of the first image texture feature values and the second image texture feature values comprise one of contrast, correlation, energy, homogeneity, gradient and entropy.

Clause 13. A computer-implemented method (400, 500) according to clause 11 or clause 12, wherein the first image texture feature values are determined based on a first grey level co-occurrence matrix statistic, and at least one of the plurality of second image texture feature values is determined based on a second grey level co-occurrence matrix statistic: and wherein the generation of the mask is based on a weighted combination of the first and second image texture feature values.

Clause 14. A computer-implemented method (400, 500) according to any of clauses 9 to 13, further comprising:

providing (506) the masked image for storage in a storage medium or for display on a display unit.

Clause 15. A computer program product comprising a non-transitory computer-readable medium (604), the computer-readable medium having computer-readable code embodied therein, the computer-readable code being configured such that, on execution by a suitable computer or processor (602), the computer or processor is caused to perform the method of any of clauses 9 to 14.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be subdivided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for masking textured regions in a medical image, the apparatus comprising:
- a processor configured to:
  - receive an input image having a plurality of pixels;
  - determine, for each pixel of the plurality of pixels, a plurality of first image texture feature values based on grey level co-occurrence matrix (GLCM) statistics, each first image texture feature value of the plurality of first image texture feature values comprising a different GLCM statistic of correlation, energy, homogeneity, gradient, or entropy value;
  - combine, for each pixel, the different GLCM statistic of each first image texture feature value for the pixel;
  - generate, based on the first image texture feature values, a mask; and
  - apply the mask to the received input image to generate a masked image.

2. The apparatus according to claim 1, wherein the processor is configured to provide the masked image for display on a display.

3. An apparatus according to claim 1, wherein the processor is further configured to:
- determine, for each pixel of the plurality of pixels, a plurality of second image texture feature values; and
- combine the first image texture feature values and the second image texture feature values;
- wherein the generation of the mask is based on the first image texture feature values and the plurality of second image texture feature values.

4. The apparatus according to claim 3, wherein the first image texture feature values are determined based on a first grey level co-occurrence matrix statistic, and at least one of the plurality of second image texture feature values is determined based on a second grey level co-occurrence matrix statistic.

5. The apparatus according to claim 3, wherein the processor is further configured to:
- apply a first weight to the first image texture feature values; and
- apply a second weight to the second image texture feature values;
- wherein the generation of the mask is based on the weighted first and second image texture feature values.

6. The apparatus according to claim 1, wherein the input image comprises a phase image.

7. The apparatus according to claim 1, wherein generating the mask comprises:
- responsive to determining that the first image texture feature value for a given pixel of the plurality of pixels meets or exceeds a defined threshold value, generating the mask in respect of the given pixel.

8. A computer-implemented method for masking textured regions in a medical image, the method comprising:
- receiving an input image having a plurality of pixels;
- determining, for each pixel of the plurality of pixels, a plurality of first image texture feature values based on computing grey level co-occurrence matrix (GLCM) statistics, each first image texture feature value of the plurality of first image texture feature values comprising a different GLCM statistic of correlation, energy, homogeneity, gradient, or entropy value;
- combine, for each pixel, the different GLCM statistic of each first image texture feature value for the pixel;
- generating, based on the first image texture feature values, a mask; and
- applying the mask to the received input image to generate a masked image.

9. The computer-implemented method of claim 8, further comprising: providing the masked image for display on a display.

10. The computer-implemented method of claim 8, further comprising:
- determining, for each pixel of the plurality of pixels, a plurality of second image texture feature values; and
- combining the first image texture feature values and the second image texture feature values;
- wherein the generation of the mask is based on the first image texture feature values and the plurality of second image texture feature values.

11. The computer-implemented method of claim 10, wherein the first image texture feature values are determined based on a first grey level co-occurrence matrix statistic, and at least one of the plurality of second image texture feature values is determined based on a second grey level co-occurrence matrix statistic; and
- wherein the generation of the mask is based on a weighted combination of the first and second image texture feature values.

12. The computer-implemented method of claim 8, further comprising:
- providing the masked image for storage in a storage medium.

13. A non-transitory computer readable medium storing instructions for masking textured regions in a medical image the instructions, when executed by one or more processors, cause the one or more processors to:

receive an input image having a plurality of pixels;

determine, for each pixel of the plurality of pixels, a plurality of first image texture feature values based on grey level co-occurrence matrix (GLCM) statistics, each first image texture feature value of the plurality of first image texture feature values comprising a different GLCM statistic of correlation, energy, homogeneity, gradient, or entropy value;

combine, for each pixel, the different GLCM statistic of each first image texture feature value for the pixel;

generate, based on the first image texture feature values, a mask; and apply the mask to the received input image to generate a masked image.

14. The non-transitory computer readable medium of claim 13, wherein the instructions further cause the one or more processors to provide the masked image for display on a display.

15. The non-transitory computer readable medium of claim 13, wherein the instructions further cause the one or more processors to:

determine, for each pixel of the plurality of pixels, a plurality of second image texture feature values; and combine the first image texture feature values and the second image texture feature values;

wherein the generation of the mask is based on the first image texture feature values and the plurality of second image texture feature values.

16. The non-transitory computer readable medium of claim 15, wherein the first image texture feature values are determined based on a first grey level co-occurrence matrix statistic, and at least one of the plurality of second image texture feature values is determined based on a second grey level co-occurrence matrix statistic; and wherein the generation of the mask is based on a weighted combination of the first and second image texture feature values.

17. The non-transitory computer readable medium of claim 13, wherein the instructions further cause the one or more processors to:

provide the masked image for storage in a storage medium.

18. The non-transitory computer readable medium of claim 13, wherein generating the mask comprises:

responsive to determining that the first image texture feature value for a given pixel of the plurality of pixels meets or exceeds a defined threshold value, generating the mask in respect of the given pixel.

* * * * *